United States Patent
Takizawa et al.

(10) Patent No.: US 6,944,531 B2
(45) Date of Patent: Sep. 13, 2005

(54) AIR FLOW SENSOR FAILURE DETERMINATION APPARATUS AND METHOD

(75) Inventors: Osamu Takizawa, Saitama (JP); Yuji Fujiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/653,465

(22) Filed: Sep. 3, 2003

(65) Prior Publication Data

US 2004/0111211 A1 Jun. 10, 2004

(30) Foreign Application Priority Data

Sep. 4, 2002 (JP) ................................. P. 2002-258589

(51) Int. Cl.[7] ................................................ G06G 7/70
(52) U.S. Cl. ..................... 701/114; 701/106; 701/107; 73/118.2
(58) Field of Search ............................... 701/114, 106, 701/107; 73/118.2

(56) References Cited

U.S. PATENT DOCUMENTS 4,873,641 A * 10/1989 Nagaishi et al. ............ 701/102
5,029,569 A * 7/1991 Cullen et al. ............... 123/494
5,190,012 A * 3/1993 Takahashi ................... 123/479
5,682,862 A * 11/1997 Sato et al. ................... 123/520

FOREIGN PATENT DOCUMENTS

| JP | 2-55616 | 2/1990 |
| JP | 3047589 | 3/2000 |

* cited by examiner

*Primary Examiner*—Tony M. Argenbright
*Assistant Examiner*—Johnny H. Hoang
(74) *Attorney, Agent, or Firm*—Arnet Fox PLLC

(57) ABSTRACT

An air flow sensor failure determination apparatus for determining a failure of an air flow sensor for an internal combustion engine in which an air flow sensor, a throttle and a pressure sensor disposed downstream of the throttle are provided in an air induction passage, the air flow sensor failure determination apparatus comprising a first calculating unit for calculating a first induction air volume based on an output signal from the air flow sensor, a second calculating unit for calculating a second induction air volume based on an output from the pressure sensor, and a determination unit for determining a failure of the air flow sensor based on a comparison between the first induction air volume and the second induction air volume.

18 Claims, 4 Drawing Sheets

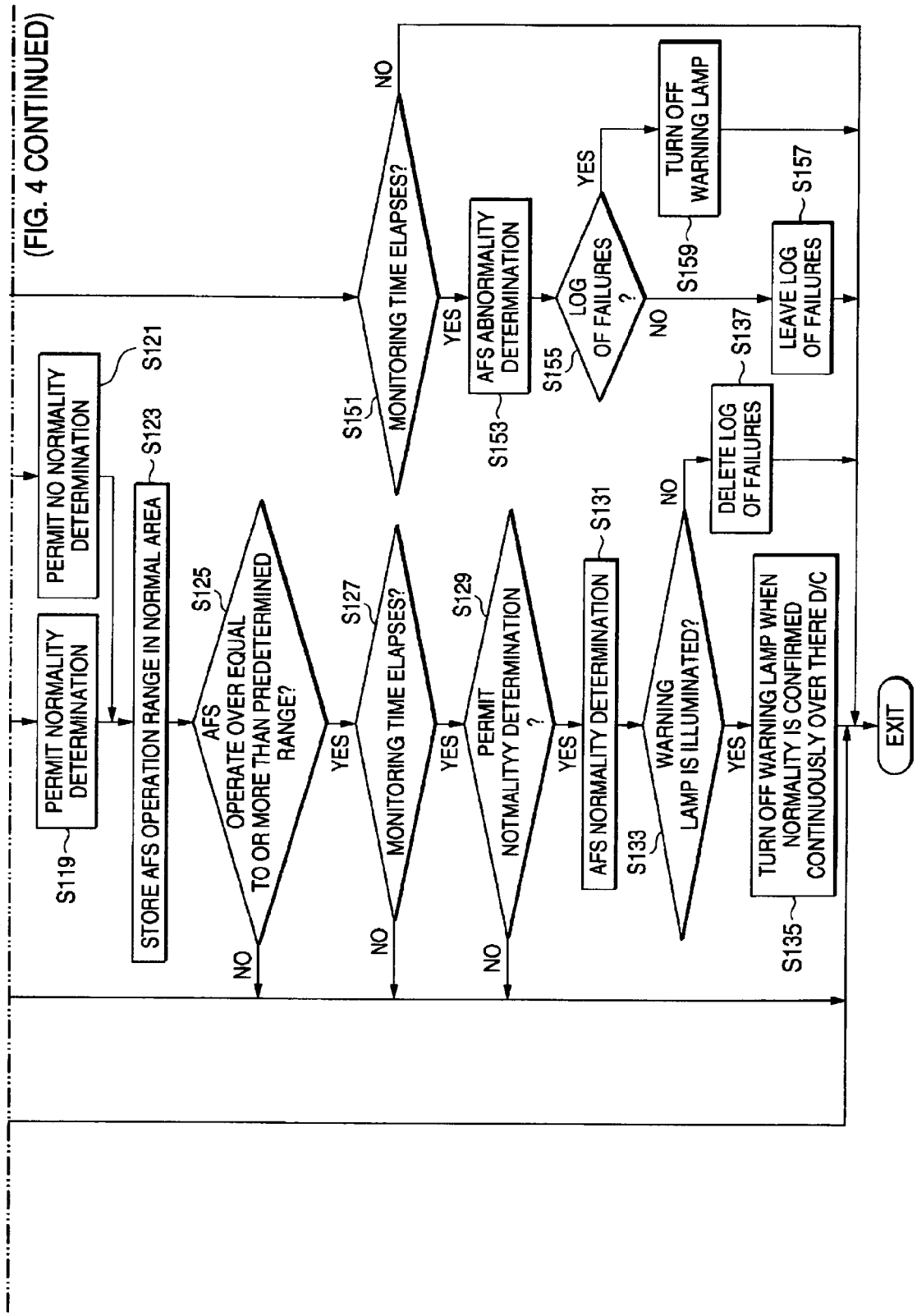

US 6,944,531 B2

AIR FLOW SENSOR FAILURE DETERMINATION APPARATUS AND METHOD

BACKGROUND OF THE INVENTION

The present invention relates to an apparatus and method for determining a failure of an air induction system of an internal combustion engine.

There is provided an air flow sensor (AFS) as an apparatus for detecting an induction air volume induced into an internal combustion engine (engine). When a disconnection of a circuit of the air flow sensor or a failure regarded as a characteristic abnormality thereof occurs, an error in detecting an induction air volume is caused, and this is attributed to the deterioration of exhaust emissions (exhaust gas). Thus, the air flow sensor needs to be monitored to see if there exists a failure.

The Examined Japanese Patent Application Publication No.Hei02-55616 describes a technique in which a failure of the air flow sensor is determined by comparing a calculated induction air volume from an output of the air flow sensor with a failure determination value set in such a manner as to correspond to the opening position of a throttle. In addition, the Japanese Patent No. 3047589 describes a technique in which a failure diagnosing area is set in correspond to the pressure in an air induction pipe.

Since the AFS failure detection approaches according to the related arts described above are such as to utilize a special driving area such as an area which is free from fluctuations in the load and rotational speed of the engine, the approaches encompass a problem that the detection frequency is reduced. An object of the invention is to provide a failure detection method which can relax the limitation on the driving area where an AFS failure detection is carried out to thereby increase the frequency at which a failure detection is carried out.

SUMMARY OF THE INVENTION

With a view to solving the problem, according to a first aspect of the invention, there is provided an air flow sensor failure determination apparatus for determining a failure of an air flow sensor for an internal combustion engine in which an air flow sensor, a throttle and a pressure sensor disposed downstream of the throttle are provided in an air induction passage, the air flow sensor failure determination apparatus comprising a first calculating unit for calculating a first induction air volume based on an output signal from the air flow sensor, a second calculating unit for calculating a second induction air volume based on an output from the pressure sensor, and a determination unit for determining a failure of the air flow sensor based on a comparison between the first induction air volume and the second induction air volume.

Further, there is provided an air flow sensor failure determination method for determining a failure of an air flow sensor for an internal combustion engine in which an air flow sensor, a throttle and a pressure sensor disposed downstream of the throttle are provided in an air induction passage, the air flow sensor failure determination method comprising the steps of; a first calculating for calculating a first induction air volume based on an output signal from the air flow sensor, a second calculating for calculating a second induction air volume based on an output from the pressure sensor, and determination for determining a failure of the air flow sensor based on a comparison between the first induction air volume and the second induction air volume.

According to the air flow sensor failure determination apparatus or method of the first aspect of the invention, a failure determination is performed based on the comparison between the first induction air volume calculated based on the output from the air flow sensor and the second induction air volume calculated based on the output from the pressure sensor disposed downstream of the throttle in the air induction passage. Since the first induction air volume and the second induction air volume are highly reliable in the normal driving area, a failure determination of the air flow sensor can be performed in a relatively wide driving area by performing a failure determination using those induction air volumes.

According to a second aspect of the invention, there is provided an air flow sensor failure determination apparatus as set forth in the first aspect of the invention, further comprising a means for compensating the second induction air volume for a variation in air volume charged downstream of the throttle as an opening position of the throttle changes, wherein the determination unit determines a failure of the air flow sensor based on a comparison between the second induction air volume compensated by the compensating means and the first induction air volume.

In a case where an induction air volume is calculated using the AFS, it is known that an overshoot is generated in a calculated value at a transient time where the opening position of the throttle changes.

Further, there is the air flow sensor failure determination method as set forth in the first aspect, further comprising a compensating step for compensating the second induction air volume for a variation in air volume charged downstream of the throttle as an opening position of the throttle changes, wherein the determination step determines a failure of the air flow sensor based on a comparison between the second induction air volume compensated by the compensating step and the first induction air volume.

According to the air flow sensor failure apparatus or method of the second aspect of the invention, the second induction air volume is compensated for an overshoot so generated. Namely, an overshoot corresponding to an overshoot generated in the first induction air volume is added to the second induction air volume, and the failure of the AFS is determined based on the comparison made between the first and second induction air volume, whereby an failure determination can be performed while the effect of the overshoot generated is cancelled.

According to a third aspect of the invention, there is provided an air flow sensor failure determination apparatus as set forth in the first aspect of the invention, wherein the first calculating unit, the second calculating unit and the determination unit comprise a computer with a memory which stores a log of failures, and wherein the determination unit is programmed to determine whether the characteristics of the air flow sensor reside in a normal area or in a failure area and, when the characteristics reside in the normal area and the log of failures records a failure of the air flow sensor, to permit a normality determination in the event that a driving area when the failure occurred overlaps a current driving area but not to permit the normality determination in the event that the driving area when the failure is determined does not overlap the current driving area.

There occurs for some reason a case where a failure of the AFS is generated in a specific driving area but is not in other driving areas.

Further, there is the air flow sensor failure determination method as set forth in the first aspect, wherein the first calculating step, the second calculating step and the determination step performs a computing with a memory which stores a log of failures, and wherein the determination step is programmed to determine whether the characteristics of the air flow sensor reside in a normal area or in a failure area and, when the characteristics reside in the normal area and the log of failures records a failure of the air flow sensor, to permit a normality determination in the event that a driving area when the failure is determined overlaps a current driving area, and not to permit the normality determination in the event that the driving area when the failure occurred does not overlap the current driving area.

According to the air flow sensor failure determination apparatus or method of the third aspect of the invention, even when the characteristics of the AFS reside in the normal area, in the event that the driving area of the AFS does not overlap the driving area when the failure is determined, the normality determination is not permitted, whereas in the event that the driving area of the AFS overlaps the driving area when the failure is determined, the normality determination is permitted, whereby the failure of the AFS generated in the specific driving area can be dealt with properly.

According to a fourth aspect of the invention, there is provided an air flow sensor failure determination apparatus as set forth in the third aspect of the invention, wherein the determination unit is programmed to determine whether or not the output of the air flow sensor changes by a predetermined value or more over a predetermined monitoring time and not to permit the normality determination in the event that the output does not so change.

Further, there is the air flow sensor failure determination method as set forth the third aspect, wherein the determination step is programmed to determine whether or not the output of the air flow sensor changes by a predetermined value or more over a predetermined monitoring time, and not to permit the normality determination in the event that the output does not so change.

Since there is a possibility that the AFS fails when the output of the AFS does not change over the predetermined monitoring time, the normality determination is permitted after it is confirmed that the output of the AFS changes.

According to a fifth aspect of the invention, there is provided an air flow sensor failure determination apparatus as set forth in the first aspect of the invention, wherein the first calculating unit, the second calculating unit and the determination unit comprise a computer with a memory which stores a log of failures, and wherein the determination unit is programmed to determine whether the characteristics of the air flow sensor reside in a normal area or in a failure area and, where the characteristics reside in the failure area, to illuminate a warning lamp in the event that the log of failures records a failure of the air flow sensor but to enter a log of failures in the memory in the event that no such log of failures exist.

Further, there is the air flow sensor failure determination method as set forth in the first aspect, wherein the first calculating step, the second calculating step and the determination step performs a computing with a memory which stores a log of failures, and the determination step is programmed to determine whether the characteristics of the air flow sensor reside in a normal area or in a failure area and, when the characteristics reside in the failure area, to illuminate a warning lamp in the event that the log of failures records a failure of the air flow sensor, and to enter a log of failures in the memory in the event that no such log of failures exist.

According to the air flow sensor failure determination apparatus of the fifth aspect of the invention, since the frequency at which a failure determination of the AFS is performed can be increased, when a failure is detected, in the event that no log of failures exist, namely, in the event that the failure so detected is the first single failure, the failure so detected is recorded as a log of failures, and when a failure is detected in the following determinations, the failure warning lamp is illuminated, whereby the reliability in illuminating the failure warning lamp can be enhanced.

According to a sixth aspect of the invention, there is provided an air flow sensor failure detection apparatus as set forth in the fifth aspect of the invention, wherein the determination unit is programmed to turn off the warning lamp and to delete the log of failures in response to the normality determination being made continuously over the predetermined number of drive cycles.

Further, there is the air flow sensor failure detection method as set forth in the fifth aspect, wherein the determination step is programmed to turn off the warning lamp and to delete the log of failures in response to the normality determination being made continuously over a predetermined number of drive cycles.

According to the sixth aspect of the invention, when the warning lamp is illuminated as a result of the failure detection and when the normality determination is performed continuously over the predetermined driving cycle, since the failure of the AFS is understood to be temporary or the failure determination is understood to be temporarily erroneous, the warning light is turned off. Thus, the temporary failure of the AFS or temporary determination error can properly be dealt with.

According to a seventh aspect of the invention, there is provided an air flow sensor failure determination apparatus as set forth in the first aspect of the invention, wherein a failure of the air flow sensor is determined when at least the pressure sensor is normal.

Further, there is the air flow sensor failure determination method as set forth in the first aspect, wherein a failure of the air flow sensor is determined when at least the pressure sensor is normal.

This is intended to perform a proper failure determination.

Still further, there is the medium including the program for performing the method according to any one of the first through the seventh aspects.

DETAILED DESCRIPTION OF THE PREFERRED EMBODIMENTS

Figure 1:
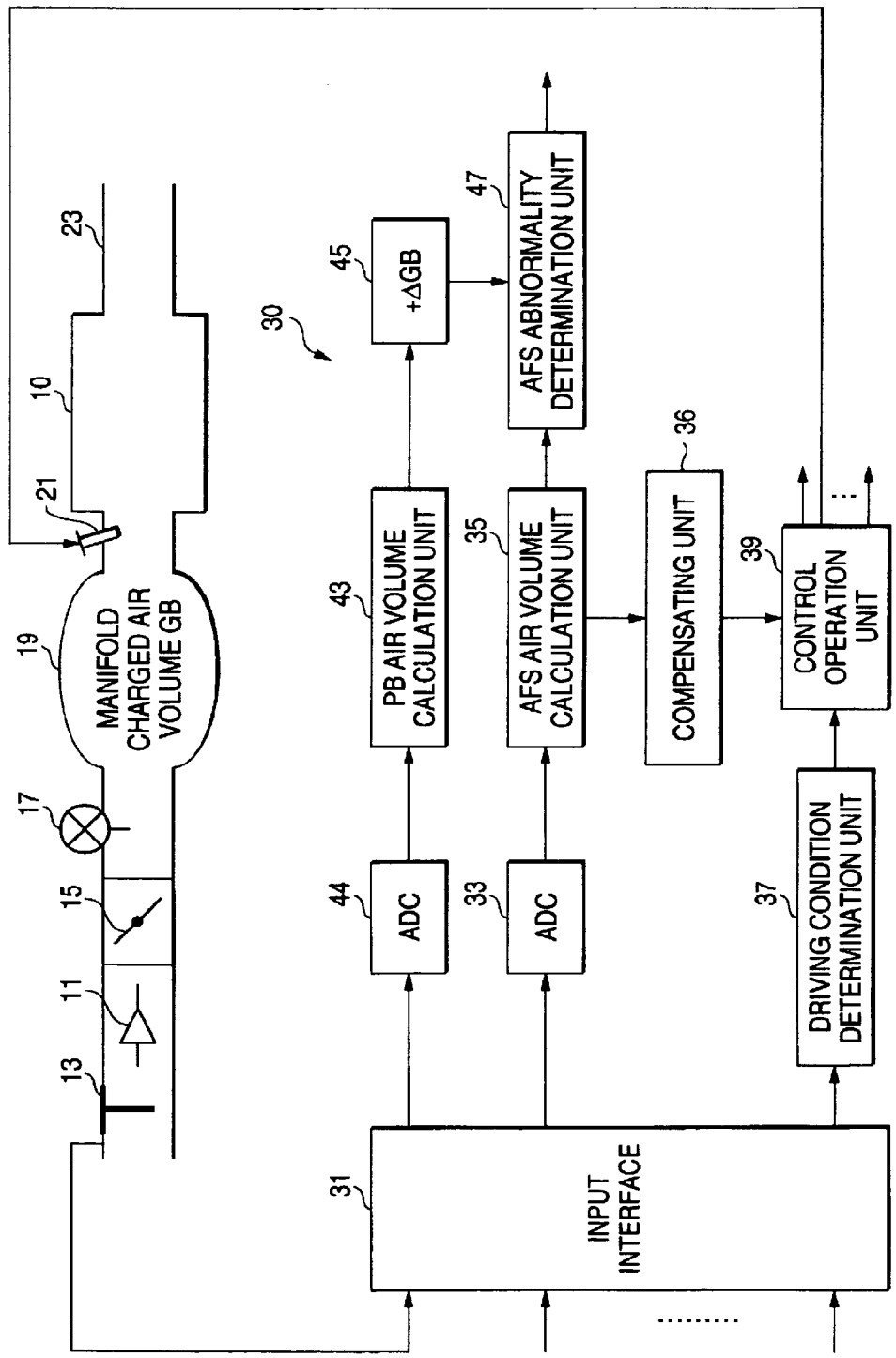
FIG. 1 is a block diagram illustrating the overall configuration of an embodiment according to the invention.

Next, referring to the accompanying drawings, an embodiment of the invention will be described. FIG. 1 is a conceptual diagram showing the whole of an engine system. Induction air passes through an induction pipe 11 and is then supplied to a cylinder 10 according to the opening of a throttle 15. Gases resulting from combustion in the cylinder 10 are discharged into the atmosphere through an exhaust pipe 23.

An injector 21 for injecting fuel is provided on the induction pipe near the cylinder 10. An air flow sensor 15 for detecting the flow rate of air induced is provided upstream of the throttle 15. The air flow sensor is an air flow meter, and a vane type air flow sensor, a Karman's vortex air flow sensor, and a hotwire type air flow sensor are well known. The invention can be applied to any of these air flow sensors.

While not shown in the figure, a crank angle sensor is provided on a crankshaft of an engine for outputting a reference angle signal every given angle in response to the rotation of the engine.

Outputs from the crank angle sensor, a coolant temperature sensor for detecting the temperature of engine coolant, the air flow sensor, an air-fuel ratio sensor and other sensors provided on respective portions of the engine are inputted into an input interface 31 of an electronic control unit 30 made up of a microcomputer. The input interface 31 processes signals so inputted and passes outputs therefrom to a driving condition determination unit 37. The driving condition determination unit judges the driving condition of a vehicle from signal inputted and passes outputs therefrom to a control operation unit 39. The control operation unit performs an operation to perform an air-fuel ratio control according to the driving conditions of the vehicle and outputs signals to drive the injector 21, an ignition plug and other constituent elements.

An induction air volume needed to control a fuel injection volume is calculated based on an output of an air flow rate determined by the air flow sensor 13. An output from the air flow sensor 13 is wave processed at the input interface 31 of the ECU 30 and is then sent to an analog/digital converter (ADC) 33. The ADC samples determination outputs from the air flow sensor 13 and transfers sequentially sampled values to an induction air volume calculating unit 35.

It is known that an output from the air flow sensor 13 contains a pulsation having a cycle T comprising an induction stroke (TDC) of the engine. The air volume calculating unit 35 includes a digital filter for processing sampled values sent from the ADC 33 to output values resulting when a pulsation frequency component is deducted from the sampled values. In general, the digital filter can arbitrarily set a frequency component to be filtered. For example, a comb filter, which exhibits remarkable attenuation properties at the pulsation frequency of the air flow sensor output, is used for the digital filter included in the induction air volume calculating unit 35. Various properties can be given to the digital filter by changing the sampling frequency and the number of taps. A Gair-afs is detected by making use of this feature.

Figure 2:
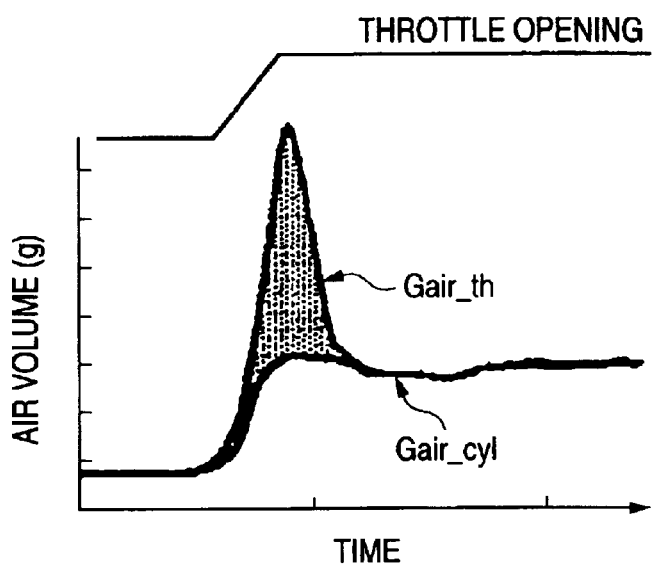
FIG. 2 is a graph illustrating a relationship between a throttle passing air volume Gair-th that is calculated when there occurs a large change in throttle opening position and a cylinder induction air volume Gair-cyl.

Next, referring to FIG. 2, it is known that when the throttle opening position changes largely, an overshoot is generated in an induction air volume Gair-afs based on an air volume determination by the air flow sensor. This phenomenon is known to be generated by a change in the air volume GB charged into an induction manifold 19 (FIG. 1) downstream of the throttle 15. Here, the Gair-afs (g/sec) is converted into an induction air volume per cylinder Gair-th (g/TDC) and the following process is performed. For example, with a four-cylinder engine, Gair-th=Gair-afs*60/(NE*2), and with a six-cylinder engine, Gair-th=Gair-afs*60/(NE*3).

In addition, it is known that this transient phenomenon is compensated by the following equation to thereby calculate an air volume Gair-cyl to be induced into the cylinder 10.

$$\text{Gair-cyl} = \text{Gair-th} - \Delta PB \cdot V/(R \cdot T) \qquad [\text{Equation 1}]$$

where, $\Delta PB$ is a pressure of the induction pipe that is detected by a pressure sensor 17 (FIG. 1) provided on the induction pipe, V is the volume of the manifold, R is a gas constant and T is the temperature of induced air.

A compensating unit 36 shown in FIG. 1 is a means for performing a compensation. The control operation unit 39 calculates a fuel injection volume based on an induction air volume so compensated and sends a control signal to the injector 21. On the other hand, in the embodiment illustrated in FIG. 1, a value is sent to a failure determination unit 47 which value is not compensated, as described above, with respect to the air volume calculated at the air volume calculating unit 35 based on the output from the AFS.

Referring to FIG. 1, the ECU 30 includes another induction air volume calculating unit 43. The induction air volume calculating unit 43 calculates an estimated induction air volume GAIRPB (g/TDC) based on an induction pipe pressure PB detected by the pressure sensor 17 provided on the induction pipe by following an equation below.

$$GAIRPB \approx PB \times V cyl/(R \times T) \qquad [\text{Equation 2}]$$

where, Vcyl is the volume of the cylinder, R is a gas constant and T is the temperature of induced air.

This GAIRPB is then sent to a $\Delta PB$ compensating unit 45, and GAIRMAPS is then calculated following an equation below.

$$GAIRMAPS = (GAIRPB + \Delta GB) \times K \times NE/60 \qquad [\text{Equation 3}]$$

where, $\Delta GB$ is an air variation (g/TDC) in the induction manifold, K is the number of induction strokes TDC per 1 rpm, and NE is an engine rotational speed (rpm). As is described by reference to FIG. 2, the overshoot is generated in the induction air volume Gair-afs calculated at the AFS air volume calculating unit 35 based on the output from the AFS when the throttle opening position changes. In this embodiment, the AFS failure determination unit 47 receives the induction air volume Gair-afs which is not compensated for the overshoot so generated. The $\Delta GB$ compensating unit 45 is intended to add this overshoot to the estimated induction air volume based on PB. Namely, instead of taking away the overshoot from Gair-afs, the overshoot is added to GAIRPB to thereby make a comparison between Gair-afs and GAIRPB.

Of course, the induction air volume Gair-th compensated for the overshoot at the compensating unit 36 (corresponding to Gair-cyl in FIG. 2) can be made to be one input that is inputted into the AFS failure determination unit, and an estimated induction air volume based on PB which is not compensated for $\Delta GB$ can be made to be the other input, whereby a failure determination can be performed.

Figure 3:
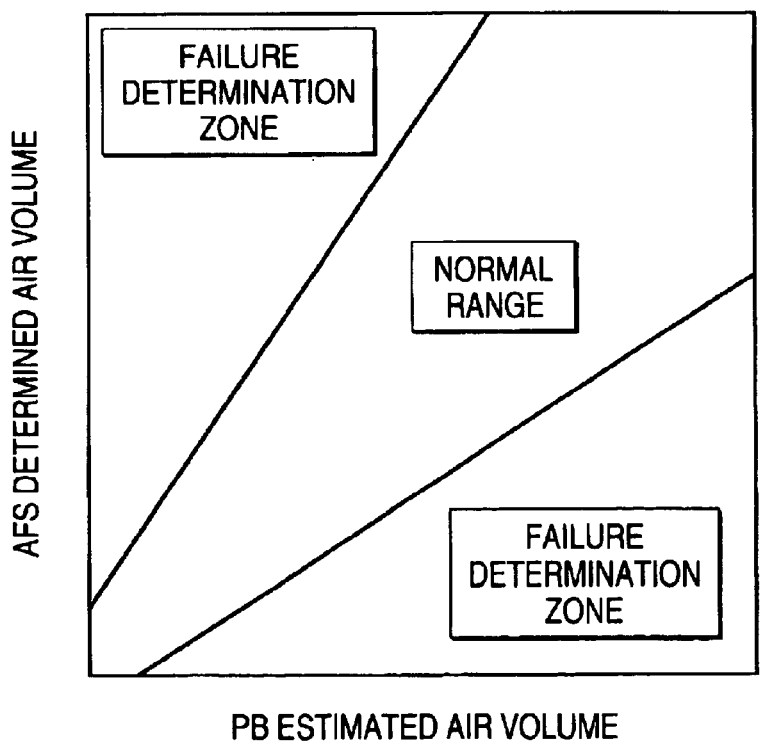
FIG. 3 is a graph illustrating a normal range and failure ranges of an air flow sensor.

The AFS failure determination unit 47 determines a failure of the AFS according to FIG. 3 based on a corresponding relationship between the estimated air volume based on PB and the air volume determined by the AFS. Namely, when the relationship between the two volumes resides in a "normal range" situated at a central portion of FIG. 3, the AFS is determined to be normal, whereas when the relationship between the two volumes resides in a "failure determination zone" situated above or below the normal range, the AFS is determined to fail. The AFS failure determination unit 47 is realized by a program stored in a ROM in the ECU 30.

Figure 4:
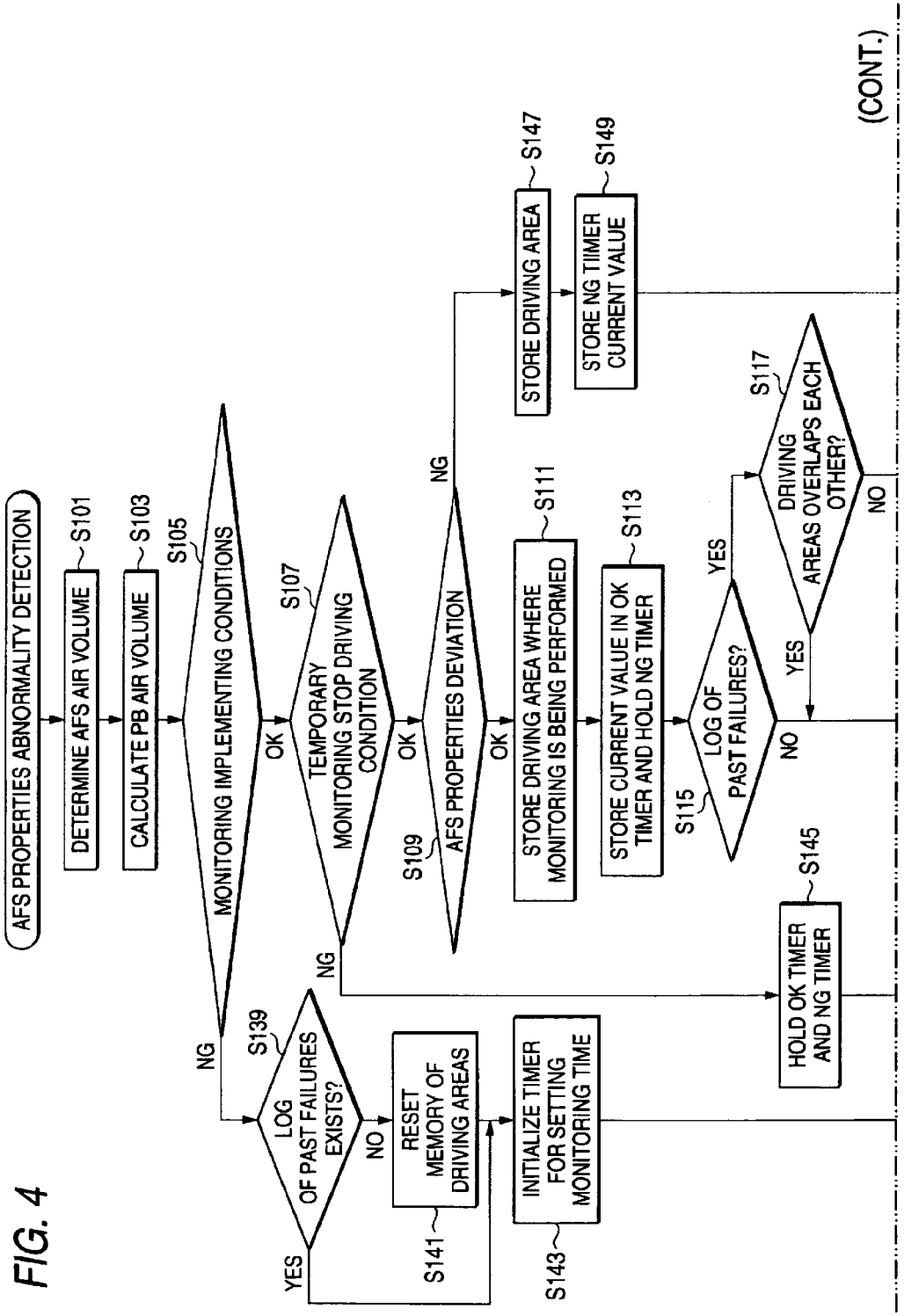
FIG. 4 is a flowchart illustrating a processing process according to the embodiment of the invention.

Next, referring to FIG. 4, a failure determination process will be described. An induction air volume is calculated based on the output from the AFS using the method that is described above (S101), and an induction air volume is calculated based on the output PB of the pressure sensor (S103). Whether or not conditions for implementing a monitoring for detecting a failure of the AFS are satisfied by checking on the engine rotational speed and engine coolant temperature, as well as the conditions of a post-start timer and a PB sensor normality determination flag (S105). For example, the monitoring implementing conditions include that the engine rotational speed (NE) resides between 600 rpm and 5000 rpm, the engine coolant temperature is equal to or higher than 70° C., three seconds elapse since the engine is started, and the PB sensor is normal (the output changes).

Thus, the monitoring is implemented when the engine is in the normal running conditions. Furthermore, in step S107, whether or not the engine is in a running condition which requires the monitoring to be stopped temporarily is determined. For example, the monitoring is stopped temporarily (NG) when the engine load is greater than the normal one.

Next, whether or not there exists a deviation in the properties of the AFS or whether or not the AFS is functioning in the normal area is determined using the method described by reference to FIG. 3 (S109). When the AFS remains normal (OK), the induction air volume calculated based on the pressure sensor output PB is stored in the memory as a parameter indicating the driving area in the current monitoring (S111). A current value of an OK timer is stored in the memory, and a NG timer is held, then advancing to step S115.

In step S115, whether or not there is a log of past failures is determined, and if there is, then, advance to step S117, where whether or not the current driving area (stored in S111) overlaps the driving area of the log of past failures is determined. When it is determined that the two areas overlap, the normality determination of the AFS is permitted (S119), whereas when they do not, the normality determination of the AFS is not permitted (S121). When a failure of the AFS is determined in the past and there exists a log of failure, only in the event that the AFT is in the normal area at a driving area equivalent to the driving area resulting when the failure determination is made in the past, the normality determination is permitted. This is because in case the driving areas are different, there may exist a possibility that determinations become different.

Next, in step S123, whether or not an output value from the AFS changes by equal to or more than a predetermined range is determined. If the output of the AFS does not so change, then end the process. When the output of the AFS changes by equal to or more than the predetermined range, then advance to step S127, where whether or not a predetermined monitoring time elapses is determined, and if the monitoring time elapses and if a normality determination enable flag (set in S119) is set (S129), a determination that the AFS is normal is made (S131). When the normality determination is not permitted in step S129 (not permitted in S121), the process is terminated.

When the normality determination is made in S131, whether or not the warning lamp is illuminated is determined in S133. The warning lamp is a lamp provided on a dashboard of the vehicle or on a vehicle body close to the driver and designed to be illuminated when there exists an abnormality. If the warning lamp is not illuminated, the log of failures is deleted and end the process. In constrast, if the warning lamp is illuminated, the warning lamp should not be turned off immediately but be turned off when the normality determination is continuously implemented over three drive cycles (driving cycles, D/Cs). This is intended to confirm that the AFS, which is determined to fail, is restored to the normal condition.

When the monitoring implementing conditions are determined not to be met in step S105, in the event that there exists no log of past failures, the memory storing an unnecessary driving area is reset (S141), and a timer for monitoring time is initialized, then end the process.

When the AFS is determined to reside in a properties deviating area or a failure area, the driving area where the monitoring is being implemented is stored in the memory (S147), and the current value of the NG timer is stored in the memory (S149). When the monitoring time elapses, an abnormality determination of the AFS is performed (S153). If the monitoring time does not elapse yet, then end the process, the process being repeated in the following processing cycle.

Thus, while the specific embodiment of the invention is described heretofore, the invention is not limited to the embodiment so described.

What is claimed is:

1. An air flow sensor failure determination apparatus for determining a failure of an air flow sensor for an internal combustion engine in which an air flow sensor, a throttle and a pressure sensor disposed downstream of the throttle are provided in an air induction passage, the air flow sensor failure determination apparatus comprising:

a first calculating unit for calculating a first induction air volume based on an output signal from the air flow sensor;

a second calculating unit for calculating a second induction air volume based on an output from the pressure sensor; and a determination unit for determining a failure of the air flow sensor based on a comparison between the first induction air volume and the second induction air volume;

wherein the air flow sensor failure determination apparatus further comprises:

means for compensating the second induction air volume for a variation in air volume charged downstream of the throttle as an opening position of the throttle changes, wherein the determination unit determines a failure of the air flow sensor based on a comparison between the second induction air volume compensated by the compensating means and the first induction air volume.

2. The air flow sensor failure determination apparatus as set forth in claim 1, wherein the first calculating unit, the second calculating unit and the determination unit comprise a computer with a memory which stores a log of failures, and wherein the determination unit is programmed to determine whether the characteristics of the air flow sensor reside in a normal area or in a failure area and, when the characteristics reside in the normal area and the log of failures records a failure of the air flow sensor, to permit a normality determination in the event that a driving area when the failure is determined overlaps a current driving area, and not to permit the normality determination in the event that the driving area when the failure occurred does not overlap the current driving area.

3. The air flow sensor failure determination apparatus as set forth in claim 2, wherein
the determination unit is programmed to determine whether or not the output of the air flow sensor changes by a predetermined value or more over a predetermined monitoring time, and not to permit the normality determination in the event that the output does not so change.

4. The air flow sensor failure determination apparatus as set forth in claim 1, wherein
the first calculating unit, the second calculating unit and the determination unit comprise a computer with a memory which stores a log of failures, and
the determination unit is programmed to determine whether the characteristics of the air flow sensor reside in a normal area or in a failure area and, when the characteristics reside in the failure area, to illuminate a warning lamp in the event that the log of failures records a failure of the air flow sensor, and to enter a log of failures in the memory in the event that no such log of failures exist.

5. The air flow sensor failure detection apparatus as set forth in claim 4, wherein
the determination unit is programmed to turn off the warning lamp and to delete the log of failures in response to the normality determination being made continuously over a predetermined number of drive cycles.

6. The air flow sensor failure determination apparatus as set forth in claim 1, wherein
a failure of the air flow sensor is determined when at least the pressure sensor is normal.

7. An air flow sensor failure determination method for determining a failure of an air flow sensor for an internal combustion engine in which an air flow sensor, a throttle and a pressure sensor disposed downstream of the throttle are provided in an air induction passage,
the air flow sensor failure determination method comprising the steps of:
a first calculating for calculating a first induction air volume based on an output signal from the air flow sensor;
a second calculating for calculating a second induction air volume based on an output from the pressure sensor; and
determination for determining a failure of the air flow sensor based on a comparison between the first induction air volume and the second induction air volume;
wherein the air flow sensor failure determination apparatus further comprises:
a compensating step compensating the second induction air volume for a variation in air volume charged downstream of the throttle as an opening position of the throttle changes, wherein
the determination step determines a failure of the air flow sensor based on a comparison between the second induction air volume compensated by the compensating step and the first induction air volume.

8. The air flow sensor failure determination method as set forth in claim 7, wherein
the first calculating step, the second calculating step and the determination step performs a computing with a memory which stores a log of failures, and wherein
the determination step is programmed to determine whether the characteristics of the air flow sensor reside in a normal area or in a failure area and, when the characteristics reside in the normal area and the log of failures records a failure of the air flow sensor, to permit a normality determination in the event that a driving area when the failure is determined overlaps a current driving area, and not to permit the normality determination in the event that the driving area when the failure occurred does not overlap the current driving area.

9. The air flow sensor failure determination method as set forth in claim 8, wherein
the determination step is programmed to determine whether or not the output of the air flow sensor changes by a predetermined value or more over a predetermined monitoring time, and not to permit the normality determination in the event that the output does not so change.

10. The air flow sensor failure determination method as set forth in claim 7, wherein
the first calculating step, the second calculating step and the determination step performs a computing with a memory which stores a log of failures, and
the determination step is programmed to determine whether the characteristics of the air flow sensor reside in a normal area or in a failure area and, when the characteristics reside in the failure area, to illuminate a warning lamp in the event that the log of failures records a failure of the air flow sensor, and to enter a log of failures in the memory in the event that no such log of failures exist.

11. The air flow sensor failure detection method as set forth in claim 10, wherein
the determination step is programmed to turn off the warning lamp and to delete the log of failures in response to the normality determination being made continuously over a predetermined number of drive cycles.

12. The air flow sensor failure determination method as set forth in claim 7, wherein
a failure of the air flow sensor is determined when at least the pressure sensor is normal.

13. A computer-readable storage medium storing a computer-readable program for performing an air flow sensor failure determination method that determines a failure of an air flow sensor for an internal combustion engine in which an air flow sensor, a throttle and a pressure sensor disposed downstream of the throttle are provided in an air induction passage,
the air flow sensor failure determination method comprising the steps of:
a first calculating for calculating a first induction air volume based on an output signal from the air flow sensor;
a second calculating for calculating a second induction air volume based on an output from the pressure sensor; and
determination for determining a failure of the air flow sensor based on a comparison between the first induction air volume and the second induction air volume;
wherein the medium further comprises:
a compensating step for compensating the second induction air volume for a variation in air volume charged downstream of the throttle as an opening position of the throttle changes, wherein
the determination step determines a failure of the air flow sensor based on a comparison between the second induction air volume compensated by the compensating step and the first induction air volume.

14. The computer-readable storage medium as set forth in claim 13, wherein the first calculating step, the second calculating step and the determination step performs a computing with a memory which stores a log of failures, and wherein the determination step is programmed to determine whether the characteristics of the air flow sensor reside in a normal area or in a failure area and, when the characteristics reside in the normal area and the log of failures records a failure of the air flow sensor, to permit a normality determination in the event that a driving area when the failure is determined overlaps a current driving area, and not to permit the normality determination in the event that the driving area when the failure occurred does not overlap the current driving area.

15. The computer-readable storage medium as set forth in claim 14, wherein the determination step is programmed to determine whether or not the output of the air flow sensor changes by a predetermined value or more over a predetermined monitoring time, and not to permit the normality determination in the event that the output does not so change.

16. The computer-readable storage medium as set forth in claim 13, wherein the first calculating step, the second calculating step and the determination step performs a computing with a memory which stores a log of failures, and the determination step is programmed to determine whether the characteristics of the air flow sensor reside in a normal area or in a failure area and, when the characteristics reside in the failure area, to illuminate a warning lamp in the event that the log of failures records a failure of the air flow sensor, and to enter a log of failures in the memory in the event that no such log of failures exist.

17. The computer-readable storage medium as set forth in claim 16, wherein the determination step is programmed to turn off the warning lamp and to delete the log of failures in response to the normality determination being made continuously over a predetermined number of drive cycles.

18. The computer-readable storage medium as set forth in claim 13, wherein a failure of the air flow sensor is determined when at least the pressure sensor is normal.

* * * * *